(12) United States Patent
Hoffman et al.

(10) Patent No.: US 8,475,316 B2
(45) Date of Patent: Jul. 2, 2013

(54) ACCESSORY DRIVE AND ENGINE RESTARTING SYSTEM

(75) Inventors: Donald E. Hoffman, Canton, MI (US); David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 12/841,375

(22) Filed: Jul. 22, 2010

(65) Prior Publication Data
US 2011/0165982 A1 Jul. 7, 2011

(51) Int. Cl.
*F16H 37/02* (2006.01)

(52) U.S. Cl.
USPC .......................................................... 475/210

(58) Field of Classification Search
USPC ................. 475/210, 211, 214, 215, 216, 217, 475/219, 189, 196; 180/53.8
See application file for complete search history.

(56) References Cited

U.S. PATENT DOCUMENTS

| | | | |
|---|---|---|---|
| 2,874,592 A | 2/1959 | Oehrli | |
| 2,901,924 A | 9/1959 | Banker | |
| 3,481,220 A | 12/1969 | Kaptur | |
| RE26,978 E | 11/1970 | Hewko | |
| 5,860,888 A * | 1/1999 | Lee | 475/210 |
| 6,302,227 B1 * | 10/2001 | Takemura et al. | 180/65.25 |
| 7,086,981 B2 | 8/2006 | Ali et al. | |
| 7,396,311 B2 | 7/2008 | Ali et al. | |
| 7,582,034 B2 * | 9/2009 | Usoro | 475/5 |
| 7,753,147 B2 * | 7/2010 | Usoro | 180/53.8 |
| 8,287,415 B2 * | 10/2012 | Glockler | 475/218 |
| 2005/0153810 A1 * | 7/2005 | Miller et al. | 475/214 |
| 2008/0179119 A1 * | 7/2008 | Grenn et al. | 180/65.2 |
| 2009/0023532 A1 * | 1/2009 | Parraga Gimeno | 475/211 |
| 2009/0048054 A1 * | 2/2009 | Tsuchiya et al. | 475/216 |
| 2009/0312145 A1 | 12/2009 | Pohl et al. | |
| 2010/0167865 A1 * | 7/2010 | Glockler | 475/219 |

* cited by examiner

*Primary Examiner* — David D Le
*Assistant Examiner* — David J Hlavka
(74) *Attorney, Agent, or Firm* — James Dottavio; MacMillian, Sobanski & Todd, LLC

(57) ABSTRACT

A drive system includes a pulley, an engine, a variator including an input and an output, for varying a ratio of output speed and input speed, and a gearset drivably interconnecting the input, the output, the engine and pulley.

17 Claims, 7 Drawing Sheets

|        | Mixing | Speed  |
|--------|--------|--------|
|        | 16     | 14     |
| Sun    | 47     | 75     |
| Ring   | 73     | 113    |
| Pinion | 12     | 18     |
| Beta   | 1.5532 | 1.5067 |

Fig. 2

| Mode | Variator Speed Ratio | Ideal Speed Ratios Pulley | Engine | Var. Input |
|---|---|---|---|---|
| Elect. Mach. Driving | 0.15625 | 1.0000 | 0.0000 | 2.5532 |
| Elect. Mach. Driving | 0.22455 | 1.0000 | 0.5000 | 1.7766 |
| Elect. Mach. Driving | 0.39894 | 1.0000 | 1.0000 | 1.0000 |
| Elect. Mach. Driving Drv. O/D | 0.62500 | 1.0000 | 1.2329 | 0.6383 |
| Engine Driving | 0.39894 | 1.0000 | 1.0000 | 1.0000 |
| Engine Driving | 0.24606 | 1.6667 | 1.0000 | 2.7021 |
| Engine Driving | 0.20650 | 2.5000 | 1.0000 | 4.8298 |

Fig. 3

|        | Mixing | Speed   |
|--------|--------|---------|
|        | 16     | 62      |
| Sun    | 47     | 75      |
| Ring   | 73     | 188     |
| Pinion | 12     |         |
| Pin. To Sun |   | 17      |
| Pin. To Ring |  | 18      |
| Beta   | 1.5532 | -2.5067 |

Fig. 6

| Mode | Variator Speed Ratio | Ideal Speed Ratios Pulley | Engine | Var. Input |
|------|---------------------|---------|--------|------------|
| Elect. Mach. Driving | 0.15625 | 1.0000 | 0.0000 | 2.5532 |
| Elect. Mach. Driving | 0.22455 | 1.0000 | 0.5000 | 1.7766 |
| Elect. Mach. Driving | 0.39894 | 1.0000 | 1.0000 | 1.0000 |
| Elect. Mach. Driving Drv. O/D | 0.62500 | 1.0000 | 1.2329 | 0.6383 |
| Engine Driving | 0.39894 | 1.0000 | 1.0000 | 1.0000 |
| Engine Driving | 0.24606 | 1.6667 | 1.0000 | 2.7021 |
| Engine Driving | 0.20650 | 2.5000 | 1.0000 | 4.8298 |

Fig. 7

|  | Mixing |
|---|---|
|  | 16 |
| Sun | 30 |
| Ring | 105 |
| Pinion | 37 |
| Beta | 3.5000 |

Fig. 9

| Mode | Variator Speed Ratio | Ideal Speed Ratios Pulley | Engine | Var. Input |
|---|---|---|---|---|
| Elect. Mach. Driving | 0.22222 | 1.0000 | 0.0000 | 4.5000 |
| Elect. Mach. Driving | 0.32787 | 1.0000 | 0.4143 | 3.0500 |
| Elect. Mach. Driving | 0.62500 | 1.0000 | 0.8286 | 1.6000 |
| Engine Driving | 0.62500 | 1.2069 | 1.0000 | 1.9310 |
| Engine Driving | 0.40486 | 1.7241 | 1.0000 | 4.2586 |
| Engine Driving | 0.32787 | 2.4138 | 1.0000 | 7.3621 |

Fig. 10

ACCESSORY DRIVE AND ENGINE RESTARTING SYSTEM

BACKGROUND OF THE INVENTION

1. Field of the Invention

This invention relates generally to a system for transmitting rotating power between an electric machine and engine in a motor vehicle, and more particularly to a system that includes a transmission having a stepless speed ratio range.

2. Description of the Prior Art

On vehicles equipped with assisted direct start (ADS), the engine is stopped when the vehicle comes to a stop with the brake pedal depressed and the accelerator pedal released. While the engine is stopped in this way, the electric machine should drive the vehicle accessories and to restart the engine when the driver signals that the vehicle is to move again by releasing the brake pedal and depressing the accelerator pedal. The electric machine replaces the alternator that is conventionally used.

A transmission located in a power path between the electric machine and the engine will allow the engine to remain at zero rotational speed while the electric machine is driving the accessories through the transmission, permit the electric machine to rotate the engine up to start speed when the engine restart is required, and allow the engine to drive the electric machine and accessories under normal driving conditions.

A need exists in the industry for a drive connection between the engine and electric machine, particularly on vehicles equipped with ADS that will provide the desired and necessary functions.

SUMMARY OF THE INVENTION

A drive system includes a pulley, an engine, a variator including an input and an output, for varying a ratio of output speed and input speed, and a gearset driveably interconnecting the input, the output, the engine and pulley.

The pulley is part of a pulley and belt system that provides a driveable connection to the electric machine and other components of the front end accessory drive.

The drive system provides a variable speed drive between the engine and the pulley when the engine is driving the electric machine and the front end accessory drive (FEAD).

The system provides a variable engine to pulley speed ratio from 0.0 to about 1:1, so that the engine can be smoothly restarted by the electric machine by varying the variator speed ratio while the electric machine continues running.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is a chart showing the number of teeth on the sun gear, ring gear, and planet pinions of the gearsets of the configuration shown in FIG. 1;

FIG. 3 is a chart showing the variation of the speed ratios of system components as the variator speed ratio changes for the configuration shown in FIG. 1;

FIG. 6 is a chart showing the number of teeth on the sun gear, ring gear, and planet pinions of the gearsets of the configurations shown in FIGS. 4 and 5;

FIG. 7 is a chart showing the variation of the speed ratios of system components as the variator speed ratio changes for the configurations shown in FIGS. 4 and 5;

FIG. 9 is a chart showing the number of teeth on the sun gear, ring gear, and planet pinions of the gearset of the configuration shown in FIG. 8;

FIG. 10 is a chart showing the variation of the speed ratios of system components as the variator speed ratio changes for the configuration shown in FIG. 8.

DESCRIPTION OF THE PREFERRED EMBODIMENT

Figure 1:
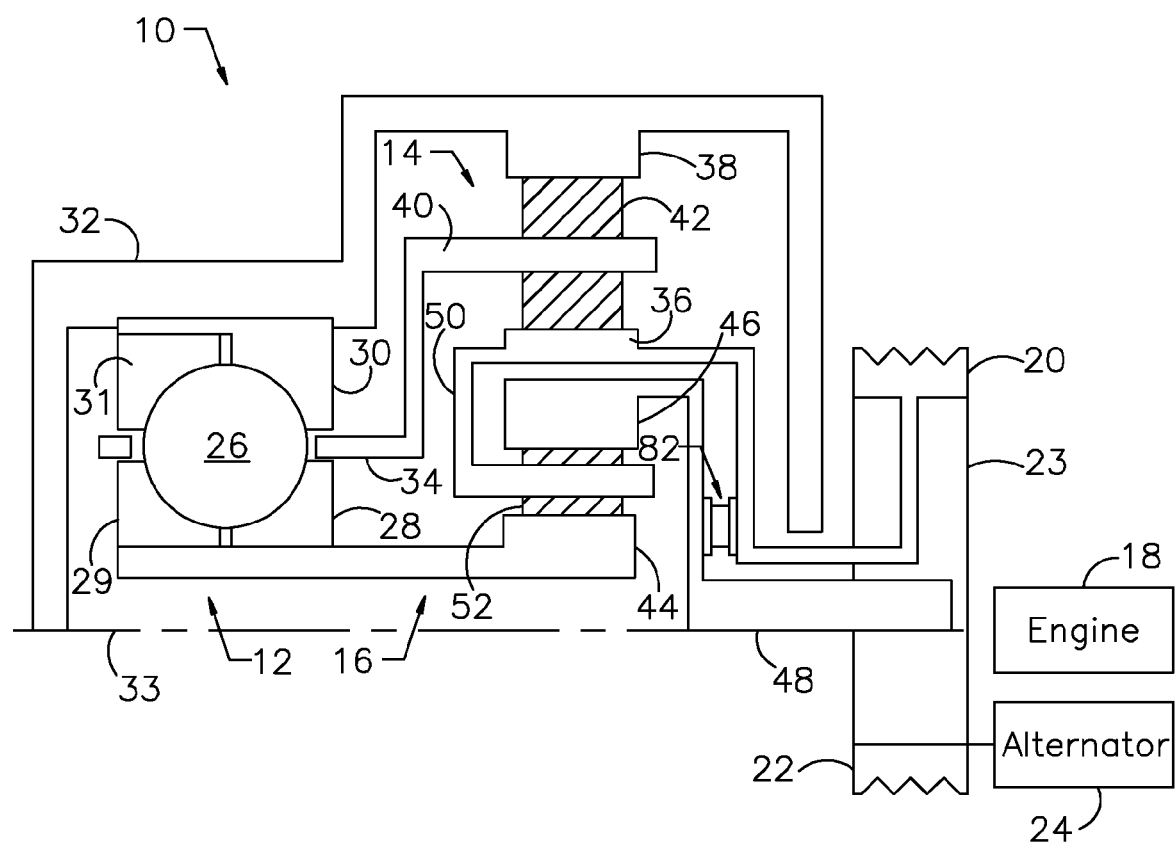
FIG. 1 is a schematic diagram of a drive system that includes a speed adjusting simple planetary gearset surrounding a mixing gearset.

Referring now to the drawings, FIG. 1 illustrates a drive system 10 that includes a Milner ball variator 12 and two planetary gearsets 14, 16. An engine 18 is connected to gearset 16. A pulley 20 is connected to gearsets 14, 16. The Milner ball variator 12, two planetary gearsets 14 and 16, and the pulley 20 are concentric with the engine crankshaft centerline 33. A pulley 22 is driveably connected to an electric machine 24. A drive belt 23 driveably connects pulleys 20 and 22 and other vehicle accessories of the FEAD. The pulleys 20 and 22 and drive belt 23 provide a fixed speed relationship between the electric machine 24 and pulley 20. The electric machine is an electromagnetic device that converts mechanical energy to electrical energy to charge the battery and power the vehicle's electric system when its engine is running. In this mode, it replaces the alternator that is more conventionally used. It also converts electrical energy to mechanical energy to drive the vehicle accessories of the FEAD when the engine is stopped as well as to restart the engine when required.

The Milner ball variator 12 includes spherical balls 26 and is a type of variable geometry, 4-point contact ball bearing. The inner race is divided in two parts 28, 29, and the outer race is divided in two parts 30, 31. By varying the axial distance between the parts of the outer race 30, 31 the distance between the parts of the inner race 28, 29 changes and the balls 26 is displaced radially between the inner and outer races. As the position of the balls changes relative to the races, the location of the contact between the balls 26 and the races varies, thereby changing the speed ratio of the variator 12.

As used in this description, the inner race 28, 29 is the input to the variator 12, the outer race 30, 31 is grounded against rotation preferably on a case or chassis 32, and the ball carrier 34, which rotates about axis 33, is the variator output. The output speed of variator 12 is always less than the speed of its input 28, 29.

Planetary speed change gearset 14 includes a sun gear 36, secured to pulley 20; a grounded ring gear 38, a carrier 40 secured to the ball carrier 34; and a set of planet pinions 42 supported for rotation on carrier 40 and in meshing engagement with the sun gear 36 and ring gear 38.

Planetary mixing gearset 16 includes a sun gear 44, secured to the inner races 28, 29; a ring gear 46, driveably connected to the shaft 48 of the engine 18; a carrier 50; and a set of planet pinions 52 supported for rotation on carrier 50 and in meshing engagement with the sun gear 44 and ring gear 46. Carrier 50 and sun gear 36 are secured mutually and driveably connected to pulley 20.

The variator 12 in combination with two planetary gearsets 14, 16 comprise transmission 10, which produces infinitely variable speed ratios.

Beta, the ratio of the ring gear pitch diameter and the sun gear pitch diameter of a planetary gearset, is chosen for planetary gearsets 14 and 16 so that, when used with the available speed ratio range of the variator 12, the overall speed ratio of the engine 18 compared to the pulley 20 can be varied between 0 and 1, or slightly more than 1. FIG. 2 shows the betas of gearsets 14, 16.

FIG. 3 shows that, when using the beta ratios of FIG. 2, setting the speed ratio of variator 12 to 0.15625, the speed ratio of the engine 18 relative to the pulley 20 is 0.00. At this speed ratio, the electric machine 24 can drive the vehicle accessories when the engine is stopped. As the speed ratio of the variator 12 increases from 0.15625, the speed ratio of the engine 18 relative to the pulley 20 will increase from 0.00 so that the engine 18 will begin to be rotated by the electric machine 24. As such, when it is desired to restart the engine, the speed ratio of the variator 20 can be increased to allow the electric machine to restart the engine 18. As FIG. 3 shows, the speed ratio of variator 12 increases to 0.39894, the speed ratio of the engine 18 relative to the pulley 20 is 1.00, by which time, the engine 18 will be running on its own power. During normal vehicle operation with the engine driving the electric machine and other vehicle accessories of the FEAD, the speed ratio of the variator 12 will typically be 0.39894 and the speed of the pulley 20 will be the same as the engine 18. However, if required by conditions, the pulley 20 can be overdriven to a speed ratio of 2.50 relative to the engine 18 by decreasing the speed ratio of the variator 12 to 0.20650.

In the transmission 60 of FIG. 4, the mixing planetary gearset 16 and variator 12 are identical to those discussed with reference to FIG. 1, except that the ball carrier 34 is secured to a compound speed change planetary gearset 62. The speed change planetary gearset 62 includes sun gear 36, which is secured to carrier 50; a ring gear 64, secured to ball carrier 34; a grounded carrier 66; first planet pinions 68, supported for rotation on carrier 66 and in meshing engagement with the sun gear 36; and second planet pinions 70, supported for rotation on carrier 66 and in meshing engagement with ring gear 64 and pinions 68.

Figure 4:
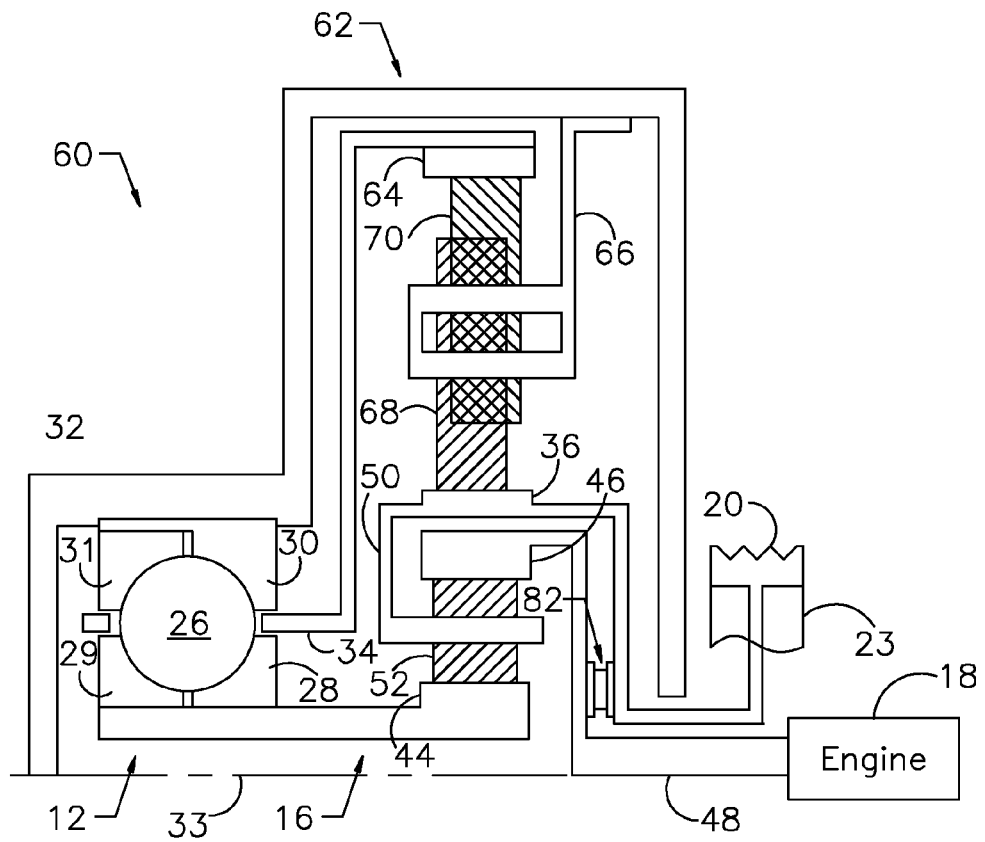
FIG. 4 is a schematic diagram of a drive system that includes a speed adjusting compound planetary gearset surrounding a mixing gearset.
Figure 5:
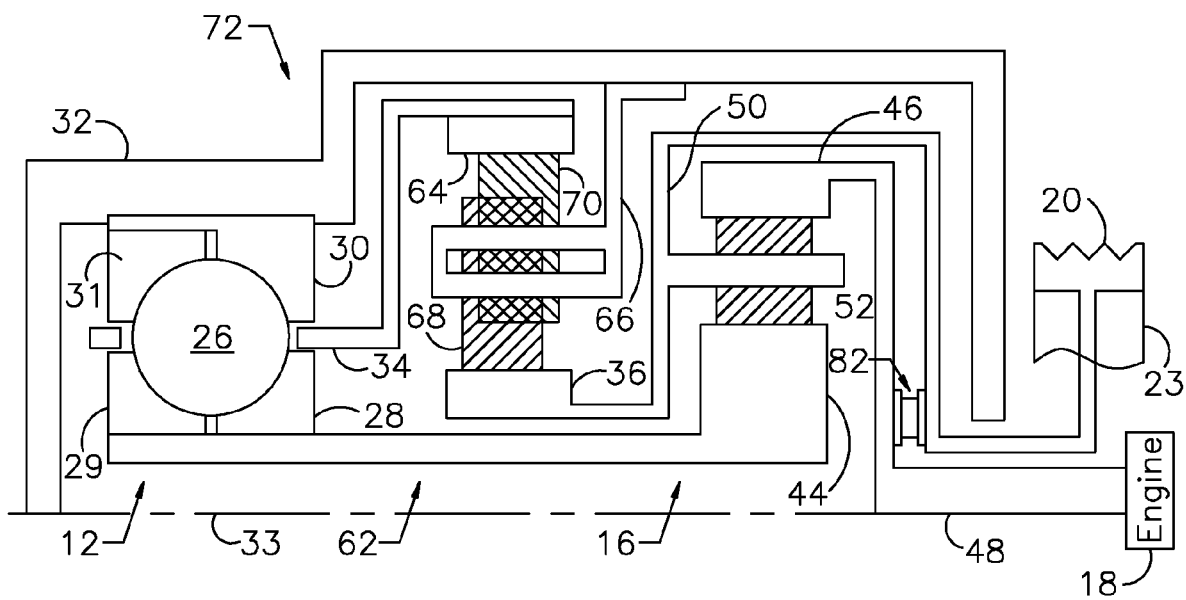
FIG. 5 is a schematic diagram of a drive system that includes a speed adjusting compound planetary gearset axially adjacent a mixing gearset.

The components and interconnections among the components of transmission 72 of FIG. 5, is substantially identical to those discussed with reference to FIG. 4, except that the speed change planetary gearset 62 is located axially adjacent the mixing planetary gearset 16, instead of in the stacked arrangement of FIG. 4.

FIG. 6 shows one set of beta ratios of the gearsets 16 and 62. However, use of the compound planetary gearset 62 and the interconnections of transmissions 60 and 72 afford greater flexibility in choosing the beta ratios. The betas of gearsets 16, 62 vary inversely. Preferably, the maximum speed ratio of transmissions 10, 60 and 72 is about 1.25. FIG. 7 shows that the speed ratios of transmissions 60, 72 react similarly to changing the speed ratio of the variator 12 as does transmission 10.

In the embodiments of FIGS. 1, 4 and 5, during normal vehicle driving conditions when the engine is driving the FEAD and pulley 20, a one-way clutch 82 can be used to drive the pulley 20 directly from the engine 18, thereby eliminating gearing and variator losses.

Figure 8:
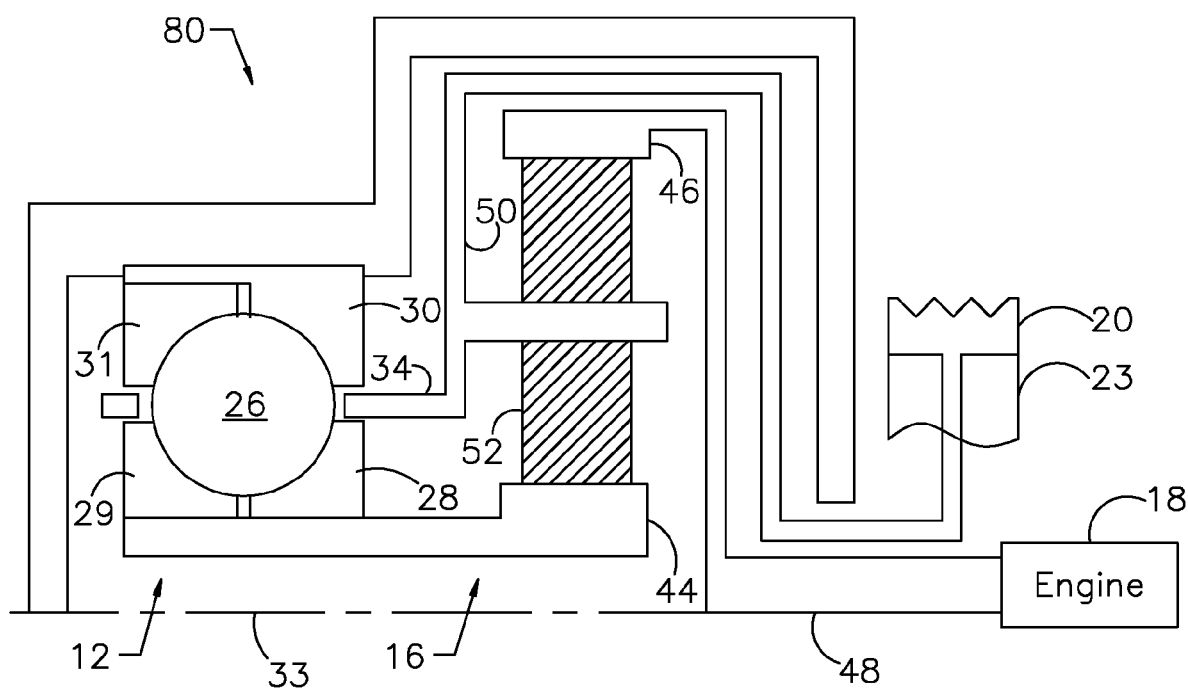
FIG. 8 is a schematic diagram of the drive system that includes a mixing planetary gearset.

The transmission 80 of FIG. 8 eliminates the speed change planetary gearset, leaving the ball variator 12 and mixing planetary gearset 16. Planetary mixing gearset 16 includes a sun gear 44, secured to the inner races 28, 29; ring gear 46, driveably connected to the shaft 48 of the engine 18; carrier 50, secured to the ball carrier 34; and a set of planet pinions 52 supported for rotation on carrier 50 and in meshing engagement with sun gear 44 and ring gear 46. Carrier 50 and ball carrier 34 are secured mutually and driveably connected to pulley 20.

FIG. 9 shows the beta ratio of the mixing planetary gearset 16 of transmission 80. FIG. 10 shows the speed ratios of the components of transmission 80 as the speed ratio of the variator 12 changes. In transmission 80, the speed ratio of the engine 18 to the pulley 20 is always less than 1.0. With the chosen beta ratio of planetary 16, the speed ratio varies from 0.0 to 0.83.

Figure 11:
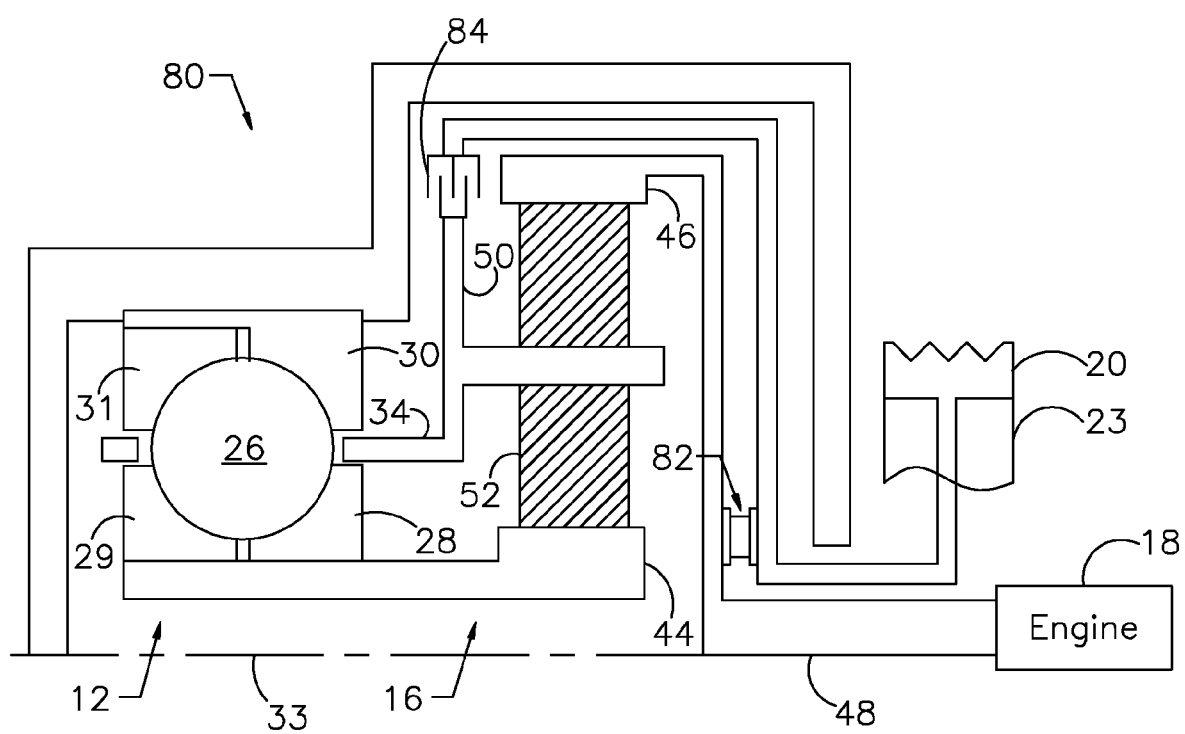
FIG. 11 is a schematic diagram of the drive system of FIG. 8 with a one way clutch and a controllable clutch in the system.

The transmission 80 of FIG. 11 is the transmission 80 of FIG. 8 with added one way clutch 82 and controllable clutch 84. The same function can be obtained with clutch 84 in other locations, such as between sun gear 44 and inner race 28, 29. In the embodiment of FIG. 11, when the electric machine 24 is driving the vehicle accessories while the engine 18 is stopped or while the electric machine 24 is restarting the engine 18, clutch 84 will be engaged to allow drive through the variator 12 and planetary 16. During normal vehicle driving conditions when the engine 18 is driving the FEAD and pulley 20, clutch 84 will be disengaged so that the pulley 20 is directly driven by the engine 18 through the one way clutch 82. However, if conditions require, clutch 84 could be engaged so that the pulley 20 will be overdriven at a speed ratio greater than 1.0 relative to the engine 18, overrunning the one way clutch 82. The disengagement function of clutch 84 could also be obtained by spreading the two sides of outer races 30, 31 to lose contact between the races 30, 31 and the spherical ball 26 when it is desired that engine 18 drive pulley 20 through one way clutch 82.

In accordance with the provisions of the patent statutes, the preferred embodiment has been described. However, it should be noted that the alternate embodiments can be practiced otherwise than as specifically illustrated and described.

The invention claimed is:

1. A drive system, comprising:
   a pulley;
   an engine;
   a variator including an input and an output, for varying a ratio of output speed and input speed;
   a gearset drivably interconnecting the input, the output, the engine and pulley;
   a clutch producing a releasable drive connection between the engine and the pulley.

2. The system of claim 1, wherein the speed ratio between the engine and pulley can vary continuously between 0.0 and a positive value.

3. The system of claim 1, wherein the gearset includes:
   a first member connected to the input;
   a second member connected to the engine; and
   a third member connected to the output and the pulley.

4. The system of claim 1, further comprising a second gearset for reducing the input speed relative to a speed of the pulley speed.

5. The system of claim 1, wherein the variator comprises:
a first race secured against rotation;
a second race comprising the input;
a least one ball engaged with the races and driving the output at a variable speed ratio depending on a location of contact between the ball and the races, the output secured to a member of the gearset.

6. The system of claim 1, wherein the gearset comprises:
a sun gear connected to the input;
a ring gear connected to the engine;
a carrier connected to the pulley and the output; and
planet pinions supported for rotation on the carrier and meshing with the sun gear and the ring gear.

7. The system of claim 1, wherein:
the variator is a ball variator that further includes, a race comprising the input, a second race secured against rotation, a ball supported for rotation between the race and the second race, and the output is a ball carrier secured to the ball.

8. A drive system, comprising:
a variator varying a speed ratio between an output and an input;
a gearset including a sun gear connected to a pulley, a ring gear, a carrier, one of the ring gear and carrier being grounded, the other being connected to the output;
a second gearset including a second sun gear connected to the input, a second ring gear connected to an engine, a second carrier connected to the pulley.

9. The drive system of claim 8, wherein:
the gearset further comprises pinions supported for rotation on the carrier and meshing with the sun gear and the ring gear; and
the second gearset further comprises second pinions supported for rotation on the second carrier and meshing with the second sun gear and the second ring gear.

10. The drive system of claim 8, wherein:
the ring gear is grounded, the carrier is connected to the output, and the sun gear is connected to the second carrier and the pulley.

11. The drive system of claim 8, wherein:
the carrier is grounded, the ring gear is connected to the output, and the sun gear is connected to the second carrier and the pulley.

12. The drive system of claim 9, wherein:
the pinions of the gearset comprise a first set of pinions meshing with the sun gear, and a second set of pinions meshing with the ring gear and pinions of the first set of pinions.

13. The system of claim 8, further comprising:
a clutch producing a one-way drive connection between the engine and the pulley.

14. A drive system, comprising:
an engine;
a pulley;
a variator including an output and an input, for varying a ratio of output speed and input speed;
a gearset including a sun gear connected to the pulley, a ring gear connected to the output, a grounded carrier, a first pinions meshing with the sun gear, and second pinions meshing with the ring gear and the first pinions;
a second gearset including a second sun gear connected to the input, a second ring gear connected to an engine, a second carrier connected to the pulley.

15. The system of claim 14, wherein the variator is a ball variator that further includes, a race comprising the input, a second race secured against rotation, a ball supported for rotation between the race and the second race, and the output is a ball carrier secured to the ball.

16. The system of claim 14, wherein the second gearset further comprises second pinions supported for rotation on the second carrier and meshing with the second sun gear and the second ring gear.

17. The system of claim 14, further comprising:
a clutch producing a one-way drive connection between the engine and the pulley.

* * * * *